(12) United States Patent
Yoshimura et al.

(10) Patent No.: US 10,118,484 B2
(45) Date of Patent: Nov. 6, 2018

(54) TRANSFER

(71) Applicant: Toyota Jidosha Kabushiki Kaisha, Toyota-shi Aichi-ken (JP)

(72) Inventors: Takahiro Yoshimura, Toyota (JP); Ryota Horie, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 285 days.

(21) Appl. No.: 15/051,233

(22) Filed: Feb. 23, 2016

(65) Prior Publication Data

US 2016/0243936 A1 Aug. 25, 2016

(30) Foreign Application Priority Data

Feb. 25, 2015 (JP) ................................. 2015-035917

(51) Int. Cl.
| | |
|---|---|
| *B60K 17/35* | (2006.01) |
| *B60K 17/344* | (2006.01) |
| *B60K 23/08* | (2006.01) |
| *F16H 48/08* | (2006.01) |

(52) U.S. Cl.
CPC ............ *B60K 17/344* (2013.01); *B60K 17/35* (2013.01); *B60K 23/0808* (2013.01); *B60K 2023/0833* (2013.01); *B60K 2023/0858* (2013.01); *F16H 48/08* (2013.01)

(58) Field of Classification Search
CPC ..................... B60K 2023/0858; B60K 23/0808
See application file for complete search history.

(56) References Cited

U.S. PATENT DOCUMENTS

| | | | | |
|---|---|---|---|---|
| 6,378,677 | B1 * | 4/2002 | Kuroda | B60K 23/04 192/35 |
| 8,042,642 | B2 * | 10/2011 | Marsh | B60K 17/348 180/247 |
| 8,313,407 | B2 * | 11/2012 | Ekonen | B60K 23/0808 180/245 |
| 8,469,854 | B1 * | 6/2013 | Downs | B60K 23/08 475/221 |
| 8,795,126 | B2 * | 8/2014 | Downs | F16H 48/22 475/201 |

(Continued)

FOREIGN PATENT DOCUMENTS

| | | | |
|---|---|---|---|
| JP | 2014-177990 | * | 9/2014 |
| JP | 2015-120501 A | | 7/2015 |

(Continued)

*Primary Examiner* — William Kelleher
*Assistant Examiner* — Gregory T Prather
(74) *Attorney, Agent, or Firm* — Dinsmore & Shohl LLP

(57) ABSTRACT

A transfer includes a main body, a subassembly and a connecting-disconnecting mechanism. The main body includes a ring gear, a case and a third bearing. The subassembly includes an input shaft, a sleeve, a moving mechanism, a first bearing and a second bearing. The connecting-disconnecting mechanism selectively connects/disconnects the ring gear to/from the input shaft. The input shaft is arranged concentric with the ring gear and inside the ring gear. The input shaft includes a first end portion and a second end portion. The input shaft is supported at the first end portion and the second end portion by the case in a manner rotatable around the rotational axis via the first bearing and the second bearing.

17 Claims, 5 Drawing Sheets

(56) References Cited

U.S. PATENT DOCUMENTS

| | | | | |
|---|---|---|---|---|
| 2003/0178277 | A1* | 9/2003 | Terada | F16D 27/108 |
| | | | | 192/48.2 |
| 2010/0274456 | A1* | 10/2010 | Kondo | B60K 23/08 |
| | | | | 701/69 |
| 2011/0082004 | A1* | 4/2011 | Kato | B60K 17/344 |
| | | | | 475/303 |
| 2012/0325030 | A1* | 12/2012 | Kinsey | B60K 17/34 |
| | | | | 74/15.82 |
| 2013/0337951 | A1* | 12/2013 | Hasewend | B60K 23/08 |
| | | | | 474/86 |
| 2015/0165901 | A1 | 6/2015 | Tamoto et al. | |
| 2016/0040776 | A1* | 2/2016 | Cradit | F16H 57/0473 |
| | | | | 192/113.1 |
| 2017/0015195 | A1* | 1/2017 | Yoshimura | B60K 17/344 |

FOREIGN PATENT DOCUMENTS

| | | |
|---|---|---|
| JP | 2015-134597 A | 7/2015 |
| JP | 2015-193368 A | 11/2015 |
| WO | 2015075541 A1 | 5/2015 |
| WO | 2015-145241 A1 | 10/2015 |

\* cited by examiner

TRANSFER

INCORPORATION BY REFERENCE

The disclosure of Japanese Patent Application No. 2015-035917 filed on Feb. 25, 2015 including the specification, drawings and abstract is incorporated herein by reference in its entirety.

BACKGROUND

1. Technical Field

The disclosure relates to a transfer.

2. Description of Related Art

U.S. Pat. No. 8,042,642 describes a transfer that enables a two-wheel-drive state (2WD) that transmits driving force from a driving source to left and right main driving wheels, and a four-wheel-drive state (4WD) that transmits driving force from the driving source to left and right auxiliary driving wheels, to be selected. In U.S. Pat. No. 8,042,642, a transfer for a four-wheel-drive vehicle outputs some of the driving force to be transmitted from the driving source to the left and right main driving wheels, to the left and right auxiliary driving wheels via a power transmitting member when switching from the two-wheel-drive state to the four-wheel-drive state.

The transfer described in U.S. Pat. No. 8,042,642 is provided with a power transmitting member, e.g., a ring gear, an input shaft, and a connecting-disconnecting mechanism. The ring gear drives a propeller shaft. The input shaft inputs some of the driving force to be transmitted from the driving source to the main driving wheels. The connecting-disconnecting mechanism connects/disconnects the input shaft to/from the ring gear. In the technology described in U.S. Pat. No. 8,042,642, in the two-wheel-drive state, the input shaft is disconnected from the ring gear by the engaging/disengaging mechanism, and in the four-wheel-drive state, the input shaft is connected to the ring gear.

SUMMARY

However, with a transfer such as that described above, the ring gear, the input shaft, and the connecting-disconnecting mechanism and the like that are provided in the transfer may result in an increase in the size of the transfer. For example, the transfer described in U.S. Pat. No. 8,042,642 has a two-axis configuration in which the rotational axis of the ring gear and the rotational axis of the input shaft are separated from each other. Having the rotational axes of the ring gear and the input shaft be separate results in the size of the transfer in a direction perpendicular to the rotational axis of the ring gear being large.

The disclosure thus provides a transfer that is able to be smaller.

An example aspect of the disclosure provides a transfer of a vehicle. The vehicle includes a driving source, a power transmitting member, main driving wheels and auxiliary driving wheels. The transfer outputs some of the driving force to be transmitted from a driving source to the main driving wheels to the auxiliary driving wheels via the power transmitting member when the vehicle is switched from a two-wheel-drive state to a four-wheel-drive state. The transfer includes a main body, a subassembly and a connecting-disconnecting mechanism. The main body includes a ring gear, a case and a third bearing. The ring gear includes a cylindrical portion and ring gear-side engaging-disengaging teeth. The ring gear-side engaging-disengaging teeth is integrally provided on an inner diameter side of the cylindrical portion. The case supports the ring gear via the third bearing in a manner enabling the ring gear to rotate around a rotational axis. The subassembly includes an input shaft, a sleeve, a moving mechanism, a first bearing and a second bearing. The input shaft, the sleeve, and the moving mechanism are integrally assembled. The input shaft is arranged concentric with the ring gear and inside the ring gear. The input shaft is supported at a first end portion of the input shaft and a second end portion of the input shaft by the case in a manner rotatable around the rotational axis via the first bearing and the second bearing. The connecting-disconnecting mechanism is configured to selectively connect and disconnect the ring gear to and from the input shaft. The connecting-disconnecting mechanism includes the sleeve. The sleeve is configured to move in the rotational axis direction on the input shaft. The sleeve is configured not to rotate relative to the input shaft. The sleeve includes sleeve-side engaging-disengaging teeth on an outer diameter side of the sleeve. The connecting-disconnecting mechanism is configured to selectively output some of the driving force to the auxiliary driving wheels depending on whether the ring gear-side engaging-disengaging teeth and the sleeve-side engaging-disengaging teeth are in mesh or not in mesh. The case has an opening, in an end portion in the rotational axis direction of the case, for inserting the subassembly into the main body and assembling the subassembly to the main body. An outer diameter dimension of components of the subassembly or an outer diameter dimension of a part of the components of the subassembly is less than an inner diameter dimension of the ring gear-side engaging-disengaging teeth. The components or the part of the components pass through the ring gear-side engaging-disengaging teeth in the rotational axis direction when the subassembly is inserted into and assembled to the main body.

According to the transfer of the four-wheel-drive vehicle structured in this way, the input shaft is arranged concentric with the ring gear and inside of the ring gear, and one end portion and the other end portion of the input shaft are supported by the case in a manner able to rotate around a rotational axis via the first bearing and the second bearing. Therefore, the rotational axis of the input shaft and the rotational axis of the ring gear are suitably close together, so the size in a direction perpendicular to the rotational axis of the ring gear in the transfer is suitably reduced. Consequently, the size of the transfer is able to be reduced. Furthermore, the outer diameter dimension of all or a portion of the component parts of the subassembly that pass through the ring gear-side engaging-disengaging teeth in the rotational axis direction when assembling the subassembly to the main body is less than the inner diameter dimension of the ring gear-side engaging-disengaging teeth, so the subassembly of the transfer is inserted from the opening of the case, and the all or a portion of the component parts of the subassembly are passed through the ring gear-side engaging-disengaging teeth. As a result, the subassembly is able to be assembled to the main body of the transfer to which component parts such as the ring gear are integrally assembled, so the component parts of the transfer such as the sleeve and the input shaft can be made into a subassembly.

In the transfer, the components or the part of the components of the subassembly that pass through the ring gear-side engaging-disengaging teeth may include the sleeve. The inner diameter dimension of the ring gear-side engaging-disengaging teeth may be a diameter dimension of a root circle of the ring gear-side engaging-disengaging teeth. The outer diameter dimension of the sleeve may be an addendum diameter dimension of the sleeve-side engaging-disengaging teeth. According to the structure described above, the outer diameter dimension of the sleeve is less than the diameter dimension of the root circle of the ring gear-side engaging-disengaging teeth, and the outer diameter dimension of that sleeve is the addendum diameter dimension of the sleeve-side engaging-disengaging teeth. Therefore, in the subassembly, all or a portion of the sleeve is able to pass through the ring gear-side engaging-disengaging teeth, and the sleeve-side engaging-disengaging teeth of that sleeve are able to intermesh with the ring gear-side engaging-disengaging teeth.

In the transfer, the components or the part of the components of the subassembly that pass through the ring gear-side engaging-disengaging teeth may include the first bearing that fits over the first end portion of the input shaft. The inner diameter dimension of the ring gear-side engaging-disengaging teeth may be a diameter dimension of an addendum circle of the ring gear-side engaging-disengaging teeth. According to the structure described above, the outer diameter dimension of the first bearing is less than the diameter dimension of the addendum circle of the ring gear-side engaging-disengaging teeth, so in the subassembly, the first bearing that is fitted over one end portion of the input shaft is able to be suitably passed through the ring gear-side engaging-disengaging teeth.

In the transfer, the moving mechanism may include a ball cam, an auxiliary clutch, an actuator, and a spring. The ball cam may include a first cage and a second cage. The first cage may be provided in a non-rotatable manner relative to input shaft, and the second cage may be provided in a non-rotatable manner relative to a friction plate of the auxiliary clutch. The sleeve may be provided in a manner non-rotatable relative to the input shaft and able to move in an axial direction. Rotation braking torque may be applied to the second cage by the actuator and the auxiliary clutch, such that thrust in the axial direction is generated in the ball cam. The sleeve may be moved in the axial direction against spring force of the spring by the first cage. According to the structure described above, in the subassembly of the transfer in which the sleeve, the moving mechanism, and the input shaft are integrally assembled, it is possible to confirm performance of the actuator by operating the actuator to check whether the moving mechanism moves the sleeve in the axial direction, before assembling the subassembly to the main body of the transfer.

In the transfer, the actuator may be an electromagnetic coil that generates the rotation braking torque in the auxiliary clutch to operate the ball cam. According to the structure described above, rotation braking torque is applied to one of the pair of cages by the auxiliary clutch, by operating the electromagnetic coil that is the actuator.

The transfer may further include a trip mechanism arranged between the second cage and the sleeve. The trip mechanism may include a first piston, a second piston, and a holder. The first piston may be configured to be driven in a reciprocating manner in the rotational axis direction a predetermined stroke via the ball cam by the actuator. The second piston may be provided in a rotatable manner relative to the input shaft. The second piston may be configured to move against the spring force by the first piston. The holder may include a plurality of tiers of retaining teeth. The holder may be provided in a non-rotatable manner relative to the input shaft and in a non-movable manner in the rotational axis direction and the holder may retain the second piston moved by the first piston by any of the plurality of tiers of retaining teeth. The trip mechanism may be configured such that the second piston moves the sleeve against the spring force to a disconnect position by a predetermined number of reciprocating strokes of the first piston. The disconnect position may be a position of the sleeve that allows relative rotation between the ring gear and the input shaft. The trip mechanism may be configured to release the second piston when the reciprocating stroke of the first piston exceeds the predetermined number of reciprocating strokes and move the sleeve to a connect position with the spring force. The connect position may be a position of the sleeve that relatively non-rotatably connects the ring gear and the input shaft together. According to the structure described above, the trip mechanism is also able to be assembled to the subassembly.

The transfer may further includes a stopper. The stopper may be fixed to the input shaft, and fixed between the sleeve and the first bearing. The spring may be arranged between the stopper and the sleeve. According to the structure described above, for example, in a subassembly in which the spring is arranged between the sleeve and the bearing on the input shaft, the bearing provided on the input shaft may come off from the spring force of the spring, but with the subassembly described above, the spring is arranged between the sleeve and the stopper on the input shaft, so the spring force of the spring is received by the stopper. As a result, the bearing is able to be prevented from coming off of the input shaft.

Also, preferably, the outer diameter of the sleeve-side engaging-disengaging teeth formed on the outer periphery of the sleeve is smaller than the inner diameter of the cylindrical portion of the ring gear, and the ring gear-side engaging-disengaging teeth formed on the ring gear are arranged between that cylindrical portion of the ring gear and the input shaft. Therefore, the sleeve is able to suitably pass into the cylindrical portion of the ring gear when the subassembly is inserted into the cylindrical portion of the ring gear.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments will be described in detail with reference to the accompanying drawings. The drawings described in the example embodiment below have been simplified or modified as appropriate, so the scale ratios and the shapes and the like of the portions are not always accurately depicted.

Figure 1:
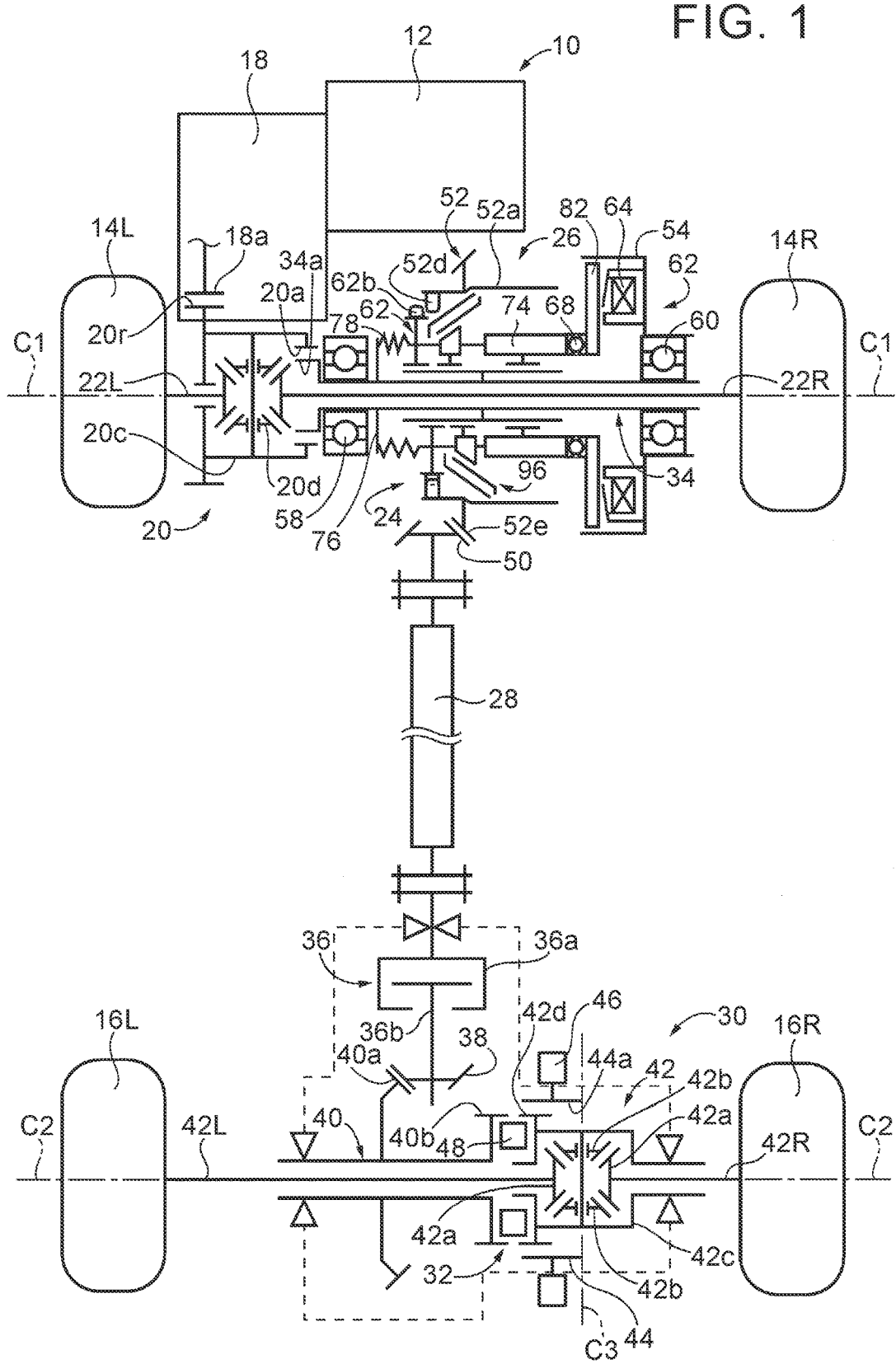
FIG. 1 is a skeleton view schematically showing the structure of a four-wheel-drive vehicle to which an example embodiment has been applied.

FIG. 1 is a skeleton view schematically showing the structure of a four-wheel-drive (4WD) vehicle 10 to which an example embodiment has been applied. As shown in FIG. 1, the 4WD vehicle 10 uses an engine 12 as a driving source, and is provided with a front engine front wheel drive (FF)-based four-wheel-drive system that includes a first power transmitting path that transmits power from the engine 12 to left and right front wheels 14L, 14R (simply referred to as "front wheels 14" unless otherwise specified), and a second power transmitting path that transmits power from the engine 12 to left and right rear wheels 16L, 16R (simply referred to as "rear wheels 16" unless otherwise specified). The front wheels 14 are an example of main driving wheels, and the rear wheels 16 are an example of auxiliary driving wheels. When the 4WD vehicle 10 is in a two-wheel-drive state (2WD), driving force transmitted from the engine 12 via an automatic transmission 18 is transmitted to the left and right front wheels 14L, 14R via a front wheel driving force distributing unit 20 and via left and right wheel axles 22L, 22R. In the two-wheel-drive state, at least a first clutch 24 provided in a transfer 26 is released, and driving force is not transmitted to a propeller shaft 28, a rear wheel driving force distributing unit 30, and the rear wheels 16. The first clutch 24 is one example of the connecting-disconnecting mechanism. The propeller shaft 28 is one example of the power transmitting member. In the four-wheel-drive state, in addition to the two-wheel-drive state described above, both the first clutch 24 and a second clutch 32 are engaged, and driving force from the engine 12 is transmitted to the propeller shaft 28, the rear wheel driving force distributing unit 30, and the rear wheels 16. Although not shown in FIG. 1, a clutch or a torque converter that is a power fluid transmitting device is provided between the engine 12 and the automatic transmission 18.

The automatic transmission 18 is a stepped automatic transmission that is provided with a plurality of planetary gear sets and friction devices (clutches and brakes), and is configured such that a speed is able to be selected by selectively engaging these friction devices. The automatic transmission 18 may also be formed by a stepped automatic transmission configured such that a speed of a constant mesh parallel shaft transmission is selected by a shift actuator and a select actuator. The automatic transmission 18 may also be formed by a continuously variable transmission configured such that a speed ratio is continuously changed by changing the effective radius of a pair of variable pulleys in which the effective radius is variable and around which a drive belt is wound. A description of the specific structure and operation of the automatic transmission 18 is omitted.

The front wheel driving force distributing unit 20 includes a ring gear 20r, a differential case 20c, and differential gears 20d. The ring gear 20r is rotatably provided around a rotational axis C1, and meshes with an output gear 18a of the automatic transmission 18. The differential case 20c is fixed to the ring gear 20r. The differential gears 20d are housed inside the differential case 20c. The front wheel driving force distributing unit 20 transmits the driving force that has been transmitted to the ring gear 20r to the left and right wheel axles 22L, 22R of the front wheels 14, while allowing differential rotation of these left and right wheel axles 22L, 22R. Internal teeth 20a are formed on the inner periphery of the differential case 20c. These internal teeth 20a mesh with first external spline teeth 34a, described later, on the outer periphery of an input shaft 34 provided in the transfer 26. As a result, some of the driving force to be transmitted from the engine 12 to the left and right front wheels 14L, 14R via the differential case 20c is input to the transfer 26 via the input shaft 34.

The rear wheel driving force distributing unit 30 that distributes driving force to the left and right rear wheels 16 includes a ring gear 40a of a cylindrical first rotating member 40 that meshes in a relatively non-rotatable manner with a drive pinion 38 that is connected via a coupling 36 to an end portion on the rear wheel 16 side of the propeller shaft 28, a second clutch 32 that selectively connects the first rotating member 40 to a pair of wheel axles 42L, 42R of the rear wheels 16, and a differential gear unit 42 that transmits the driving force from the engine 12 input via the second clutch 32, while giving appropriate differential rotation to the left and right wheel axles 42L, 42R of the rear wheels 16, as shown in FIG. 1.

The differential gear unit 42 includes a differential case 42c that is rotatably supported around a rotational axis C2, a pair of side gears 42a that are connected to the pair of wheel axles 42L, 42R, respectively, of the rear wheels 16, and are supported by the differential case 42c in a manner able to rotate around the rotational axis C2 in a state facing each other inside the differential case 42c, and a pair of pinions 42b that are supported by the differential case 42c in a manner able to rotate around a rotational axis C3 that is orthogonal to the rotational axis C2, and are arranged between, and in a state in mesh with, the pair of side gears 42a, as shown in FIG. 1. Also, a description of the specific structure and operation of the differential gear unit 42 will be omitted.

The coupling 36 is provided between the propeller shaft 28 and the first rotating member 40, as shown in FIG. 1. The coupling 36 transmits torque between one rotating element 36a and another rotating element 36b. The coupling 36 is an electronically controlled coupling formed by a wet type multiple disc clutch, for example, and is able to continuously change the torque distribution to the front and rear wheels between 100:0 and 50:50, by controlling the transfer torque of the coupling 36.

As shown in FIG. 1, the wheel axle 42L passes through the inner peripheral side of the cylindrical first rotating member 40. The ring gear 40a is formed on the end portion, on the side opposite the differential gear unit 42 side, of the first rotating member 40, and this ring gear 40a are in mesh with the drive pinion 38. Therefore, the first rotating member 40 rotates together with the drive pinion 38. Clutch teeth 40b that form a portion of the second clutch 32 is formed on the end portion, on the differential gear unit 42 side, of the first rotating member 40. Clutch teeth 42*d* that form a portion of the second clutch 32 are formed on the end portion, on the first rotating member 40 side, of the differential case 42*c* of the differential gear unit 42.

The second clutch 32 is a mesh clutch for selectively connecting the first rotating member 40 to the differential case 42*c* of the differential gear unit 42, i.e., a mesh clutch for connecting/disconnecting the first rotating member 40 to/from the differential gear unit 42. The second clutch 32 is a mesh type dog clutch (connecting-disconnecting mechanism) that includes the clutch teeth 40*b* formed on the first rotating member 40, the clutch teeth 42*d* formed on the differential case 42*c*, a sleeve 44, and a second actuator 46. The sleeve 44 has internal teeth 44*a* that are able to mesh with the clutch teeth 40*b* and the clutch teeth 42*d*, and is provided so as to be able to move in the rotational axis C2 direction. The second actuator 46 drives the sleeve 44 in the rotational axis C2 direction. The second actuator 46 drives the sleeve 44 in the rotational axis C2 direction in response to a command signal output from an electronic control unit, not shown. The second clutch 32 is provided with a synchronizing device 48 that synchronizes the rotation of the first rotating member 40 with the rotation of the differential case 42*c* before meshing the internal teeth 44*a* of the sleeve 44 with the clutch teeth 40*b* of the first rotating member 40. In the second clutch 32, when the sleeve 44 is moved to the differential gear unit 42 side by the second actuator 46, and the propeller shaft 28 is disengaged from the rear wheels 16L, 16R, i.e., the first rotating member 40 is disengaged from the differential case 42*c*, as shown in FIG. 1, in the two-wheel-drive state in which the first clutch 24 is released, the propeller shaft 28 is disconnected from the left and right rear wheels 16L, 16R. As a result, running resistance of the vehicle from rotational resistance of the propeller shaft 28 and the like is reduced. In this example embodiment, the second clutch 32 is one example of one disconnect mechanism.

Figure 2:
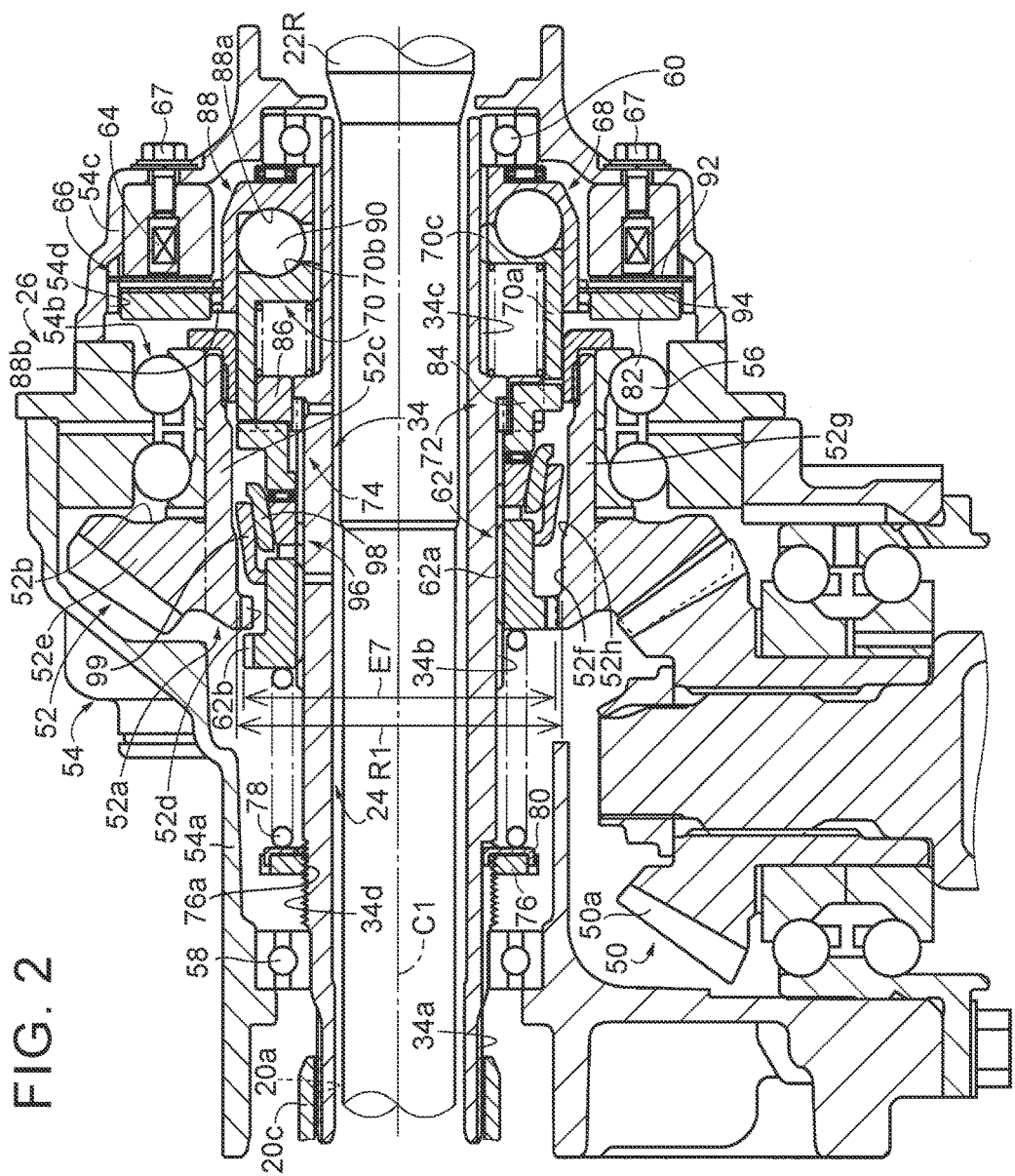
FIG. 2 is a sectional view illustrating the structure of a transfer provided in the four-wheel-drive vehicle in FIG. 1.

The transfer 26 includes a cylindrical ring gear 52, the cylindrical input shaft 34, and the first clutch (connecting-disconnecting mechanism) 24, as shown in FIGS. 1 and 2. The ring gear 52 meshes with a driven pinion 50 so as to transmit power. The ring gear 52 is connected to the end portion on the front wheel 14 side of the propeller shaft 28, via the driven pinion 50, in order to drive the propeller shaft 28. Some of the driving force to be transmitted from the engine 12 to the front wheels 14L, 14R via the differential case 20*c* is input to the input shaft 34. The first clutch (connecting-disconnecting mechanism) 24 connects/disconnects the differential case 20*c* to/from the propeller shaft 28, i.e., the input shaft 34 that is connected to the differential case 20*c* to/from the ring gear 52 that is connected to the propeller shaft 28, in a power transmission path from the differential case 20*c* to the propeller shaft 28. When the first clutch 24 is engaged in the transfer 26 such that the input shaft 34 is connected to the ring gear 52, some of the driving force to be transmitted from the engine 12 to the left and right front wheels 14L, 14R is output to the left and right rear wheels 16L, 16R via the propeller shaft 28. In this example embodiment, the first clutch 24 is one example of another disconnect mechanism.

Figure 3:
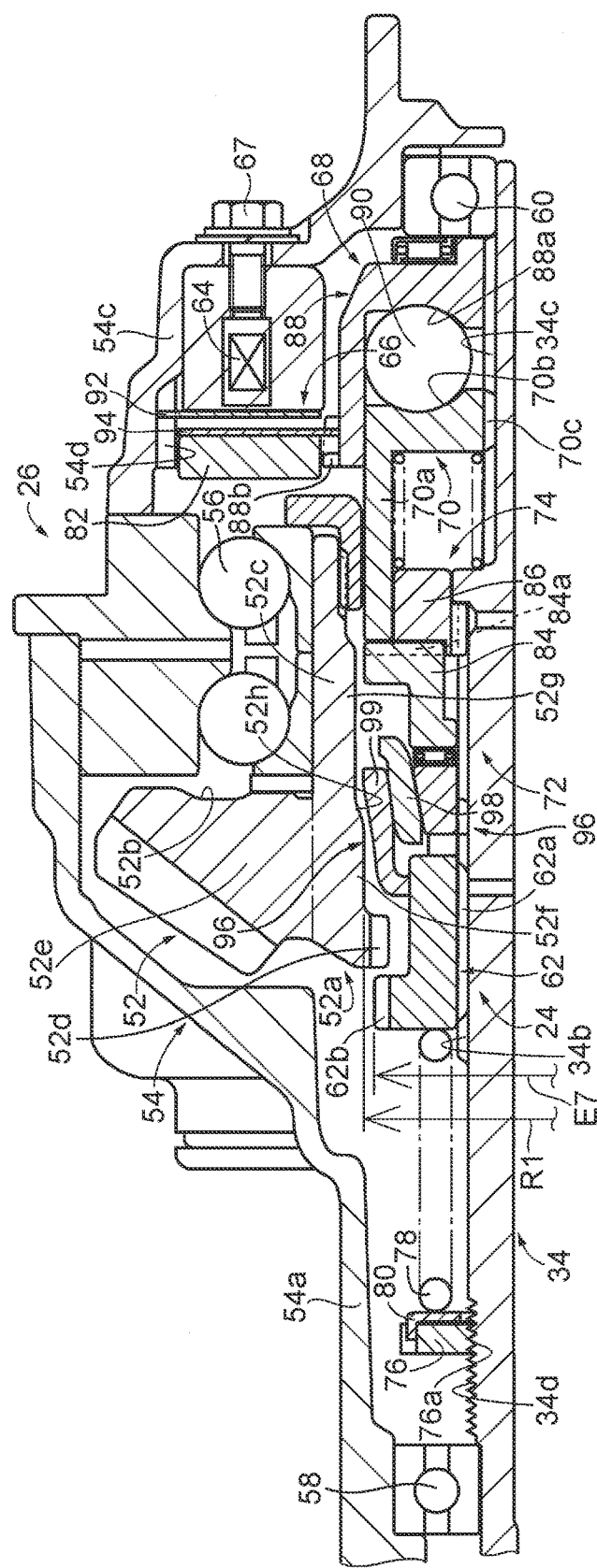
FIG. 3 is an enlarged view of FIG. 2, illustrating a ring gear, an input shaft, a connecting-disconnecting mechanism, and a moving mechanism and the like provided in the transfer shown in FIG. 2.

The transfer 26 is provided with a unit case (case) 54 within which the cylindrical ring gear 52, the cylindrical input shaft 34, and the first clutch 24 and the like are housed, as shown in FIGS. 2 and 3. The unit case 54 includes a case member 54*a* and a cover member 54*c*. The case member 54*a* covers a majority of the component parts of the transfer 26 such as the ring gear 52, the input shaft 34, and the first clutch 24. The cover member 54*c* closes off an opening 54*b* formed in one end, on the front wheel 14R side in the rotational axis C1 direction, of the case member 54*a*. The case member 54*a* and the cover member 54*c* are integrally fastened together by a fastening member such as a bolt, for example, not shown.

The cylindrical ring gear 52 is a bevel gear on which a helical or hypoid gear, for example, is formed, as shown in FIGS. 2 and 3. A cylindrical portion 52*a* having a generally cylindrical shape formed on an inner peripheral portion of the ring gear 52, is integrally provided on the ring gear 52. A shaft portion 52*c* that protrudes in a generally cylindrical shape from a side surface 52*b* of the ring gear 52 toward the front wheel 14R side is formed on the cylindrical portion 52*a*. The shaft portion 52*c* is supported by the case member 54*a* of the unit case 54 via a bearing (third bearing) 56. That is, the ring gear 52 is rotatably supported in a cantilevered manner via the bearing 56 around the rotational axis C1 by the case member 54*a*. Internal engaging-disengaging teeth (ring gear-side engaging-disengaging teeth) 52*d* are integrally formed on the ring gear 52 between the cylindrical portion 52*a* and the input shaft 34, i.e., on the inner diameter side of the cylindrical portion 52*a*. The alternate long and short dash line shown in the ring gear 52 in FIGS. 2 and 3 virtually shows the cylindrical portion 52*a* of the ring gear 52. A tooth portion 52*e* that meshes with teeth 50*a* of the driven pinion 50 is integrally formed on the end portion on the front wheel 14L side of the cylindrical portion 52*a*.

The cylindrical input shaft 34 passes through the inside of the cylindrical portion 52*a* of the ring gear 52, and a portion of the input shaft 34 is arranged inside the cylindrical portion 52*a* of the ring gear 52, as shown in FIGS. 2 and 3. The cylindrical input shaft 34 supported at both end portions thereof by the unit case 54 via a first bearing 58 and a second bearing 60, so the input shaft 34 is rotatably supported around the rotational axis C1, i.e., supported so as to be able to rotate concentrically with the ring gear 52. The first bearing 58 is arranged between an end portion on the front wheel 14L side of the case member 54*a* and an end portion (a first end portion) on the front wheel 14L side of the input shaft 34. That is, the first bearing 58 is fit over the first end portion on the front wheel 14L side of the input shaft 34. The second bearing 60 is arranged between an end portion on the front wheel 14R side of the cover member 54*c* and an end portion (a second end portion) on the front wheel 14R side of the input shaft 34. That is, the second bearing 60 is fit over the second end portion on the front wheel 14R side of the input shaft 34. First external spline teeth 34*a* formed on an outer peripheral surface of the first end portion on the front wheel 14L side of the input shaft 34, second external spline teeth 34*b* formed on an outer peripheral surface of the center portion of the input shaft 34, and third external spline teeth 34*c* formed on an outer peripheral surface of the end portion on the front wheel 14R side of the input shaft 34, are integrally provided on the cylindrical input shaft 34.

The first clutch 24 is a mesh type dog clutch for connecting/disconnecting the input shaft 34 to/from the ring gear 52 in the transfer 26. The first clutch 24 includes the internal engaging-disengaging teeth 52*d*, and a cylindrical movable sleeve (sleeve) 62 that includes internal meshing teeth 62*a*. The internal engaging-disengaging teeth 52*d* are provided on the ring gear 52. The internal meshing teeth 62*a* mesh with second external spline teeth 34*b* of the input shaft 34 such that the movable sleeve 62 is able to move in the rotational axis C1 direction and is unable to rotate relative to the input shaft 34 around the rotational axis C1. External engaging-disengaging teeth (sleeve-side engaging-disengaging teeth) 62*b* that are able to mesh with the internal engaging-disengaging teeth 52*d* by the cylindrical movable sleeve (sleeve) 62 moving in the rotational axis C1 direction are provided on the movable sleeve 62. The first clutch 24 is configured such that some of the driving force transmitted from the engine 12 to the left and right front wheels 14L, 14R is output via the propeller shaft 28 to the left and right rear wheels 16L, 16R, depending on whether the internal engaging-disengaging teeth 52*d* that are integrally provided on the ring gear 52 and the external engaging-disengaging teeth 62*b* that are integrally provided on the outer diameter side of the sleeve 62 are in mesh or not in mesh. The cylindrical movable sleeve 62 is such that the external engaging-disengaging teeth 62*b* are formed on an end portion on the front wheel 14L side of the movable sleeve 62, and a portion of the movable sleeve 62 is arranged to the inside of the internal engaging-disengaging teeth 52*d* of the ring gear 52, i.e., inside the cylindrical portion 52*a* of the ring gear 52.

The transfer 26 is provided with a moving mechanism 72 that moves the movable sleeve 62 in the rotational axis C1 direction, and moves the movable sleeve 62 to a connect position and a disconnect position, as shown in FIGS. 2 and 3. The connect position is a position where the movable sleeve 62 moves in the rotational axis C1 direction and the external engaging-disengaging teeth 62*b* of the movable sleeve 62 mesh with the internal engaging-disengaging teeth 52*d* of the ring gear 52. In the connect position, the ring gear 52 is unable to rotate relative to the input shaft 34. The disconnect position is a position where the movable sleeve 62 moves in the rotational axis C1 direction and the external engaging-disengaging teeth 62*b* of the movable sleeve 62 does not mesh with the internal engaging-disengaging teeth 52*d* of the ring gear 52. In the disconnect position, the ring gear 52 and the input shaft 34 are able to rotate relative to each other.

The moving mechanism 72 is provided with a ball cam 68, an auxiliary clutch 66, a first actuator (actuator) 64, a spring 78, and a ratchet mechanism (trip mechanism) 74. The first actuator 64 is an electromagnetic coil that makes the auxiliary clutch 66 generate rotation braking torque. The first actuator 64 is integrally fixed by a fastening device such as a fastening bolt 67, for example, to the cover member 54*c* of the unit case 54. The ball cam 68 is a device that converts rotary force of the input shaft 34 into thrust in the rotational axis C1 direction of the input shaft 34 when rotation braking torque is generated in an annular second cage 88, described later, via the auxiliary clutch 66 by the first actuator 64. The ratchet mechanism 74 moves the movable sleeve 62 and maintains the moving position of the movable sleeve 62 according to the thrust converted by the ball cam 68. The spring 78 is interposed between the movable sleeve 62 and an annular stopper 76 that is fixed to the input shaft 34, and urges the movable sleeve 62 from the disconnect position toward the connect position. That is, the spring 78 urges the movable sleeve 62 toward the front wheel 14R side in the rotational axis C1 direction. As a result, the moving mechanism 72 applies rotation braking torque to the second cage 88 with the first actuator 64 and the auxiliary clutch 66 to generate thrust in the rotational axis C1 direction in the ball cam 68, and moves the movable sleeve 62 in the rotational axis C1 direction against the urging force (spring force) of the spring 78 via the ratchet mechanism 74 with a first cage 70 that will be described later.

The stopper 76 is provided with an internally threaded portion 76*a* that screws together with an externally threaded portion 34*d* formed on an outer peripheral surface between the first external spline teeth 34*a* and the second external spline teeth 34*b* of the input shaft 34, as shown in FIGS. 2 and 3. The stopper 76 is arranged in a fixed position between the movable sleeve 62 and the first bearing 58 on the input shaft 34. A rotation stopping member 80 that prevents the stopper 76 from rotating around the rotational axis C1 is provided on the stopper 76.

The ratchet mechanism 74 includes an annular first piston 70*a*, an annular second piston 84, and an annular holder 86. The first piston 70*a* is moved in a reciprocating manner (back and forth) in the rotational axis C1 direction a predetermined stroke via the ball cam 68 by an electromagnetic coil, i.e., the first actuator 64, attracting a disk-shaped movable piece 82. The second piston 84 is provided in a manner able to rotate relative to the input shaft 34, and is moved in the rotational axis C1 direction against the urging force of the spring 78 by the first piston 70*a*. The holder 86 has retaining teeth 86*a* (see FIGS. 4A to 4E), and is provided in a manner unable to rotate relative to the input shaft 34 and unable to move in the rotational axis C1 direction, and retains the second piston 84 moved by the first piston 70*a* with the retaining teeth 86*a*. In the ratchet mechanism 74, the movable sleeve 62 is moved by the second piston 84 against the urging force of the spring 78 toward the disconnect position, by the first piston 70*a* being moved back and forth in the rotational axis C1 direction, and the second piston 84 is retained by the retaining teeth 86*a* of the holder 86. Then, when the first piston 70*a* is again moved back and forth in the rotational axis C1 direction, the second piston 84 is released from the retaining teeth 86*a* of the holder 86, and the movable sleeve 62 moves toward the connect position by the urging force of the spring 78. As shown in FIGS. 2 and 3, the first piston 70*a* of the ratchet mechanism 74 is integrally provided on the first cage 70 of the ball cam 68, and the ratchet mechanism 74 is arranged between the movable sleeve 62 and the second cage 88 of the ball cam 68.

The ball cam 68 has a pair of annular cages, i.e., the first cage 70 and the second cage 88, and a plurality of spherical rolling elements 90, provided between the second bearing 60 and the second piston 84 of the ratchet mechanism 74. The pair of cages, i.e., the first cage 70 and the second cage 88, are interposed in a manner overlapping in the rotational axis C1 direction. The plurality of (e.g., three) spherical rolling elements 90 are provided in a plurality of locations (e.g., three locations) in the circumferential direction in the first cage 70 and the second cage 88, and are sandwiched by a pair of groove-shaped cam surfaces 70*b* and 88*a* that face each other and have depths that change in the circumferential direction. When the first cage 70 and the second cage 88 are rotated relative to each other in the ball cam 68, the first cage 70 and the second cage 88 move away from each other in the rotational axis C1 direction. As a result, when the first piston 70*a* is moved back and forth once toward the front wheel 14R side and the front wheel 14L side in the rotational axis C1 direction by the ball cam 68, the movable sleeve 62 moves toward the disconnect position against the urging force of the spring 78 via the ratchet mechanism 74, as shown in the transfer 26 above the rotational axis C1 shown in FIG. 2, i.e., on the engine 12 side. Then, the external engaging-disengaging teeth 62*b* of the movable sleeve 62 come out of mesh with the internal engaging-disengaging teeth 52*d* of the ring gear 52, such that the first clutch 24 releases. When the first piston 70*a* moves back and forth twice by the ball cam 68, i.e., when the movable sleeve 62 is placed in the disconnect position, and then the first piston 70*a* moves back and forth once, the second piston 84 is released from the retaining teeth 86a of the holder 86 and the movable sleeve 62 moves to the connect position by the urging force of the spring 78, as shown in the transfer 26 below the rotational axis C1 shown in FIG. 2, i.e., on the side opposite the engine 12 side. Then, the external engaging-disengaging teeth 62b of the movable sleeve 62 intermesh with the internal engaging-disengaging teeth 52d of the ring gear 52, such that the first clutch 24 engages.

The auxiliary clutch 66 that is arranged between an electromagnetic coil, i.e., the first actuator 64, and the movable piece 82, and has a disk-shaped first friction plate (friction plate) 92 and a disk-shaped second friction plate (friction plate) 94, as shown in detail in FIG. 3, is provided between the electromagnetic coil and the movable piece 82. The first friction plate 92 is engaged with internal spline teeth 54d provided on the cover member 54c of the unit case 54, in a manner unable to rotate around the rotational axis C1 but able to move in the rotational axis C1 direction. The second friction plate 94 is arranged between the first friction plate 92 and the movable piece 82, and is engaged with external spline teeth 88b formed on the second cage 88, in a manner unable to rotate around the rotational axis C1 but able to move in the rotational axis C1 direction. The groove-shaped cam surfaces 70b and 88a formed in a plurality of locations in the circumferential direction between the annular first cage 70 and the annular second cage 88 are inclined such that the distance in the rotational axis C1 direction between these cam surfaces 70b and 88a becomes shorter farther along in the circumferential direction. The cam surfaces 70b and 88a shown in the sectional view in FIG. 3 are shown in a state in which the center distance between these cam surfaces 70b and 88a is the longest. Internal meshing teeth 70c that mesh in a manner unable to rotate relative to the third external spline teeth 34c of the input shaft 34 but able to move in the rotational axis C1 direction, are provided on the inner peripheral surface of the first cage 70.

With the electromagnetic coil, i.e., the first actuator 64, the auxiliary clutch 66, and the ball cam 68 structured as described above, when the movable piece 82 is attracted by the electromagnetic coil while the input shaft 34 is rotating while the vehicle is running, for example, the first friction plate 92 and the second friction plate 94 of the auxiliary clutch 66 are squeezed between the movable piece 82 and the electromagnetic coil by the movable piece 82, such that rotation braking torque is transmitted to the second friction plate 94. That is, when the movable piece 82 is attracted by the electromagnetic coil, rotation braking torque is transmitted to the second cage 88 via the second friction plate 94 of the auxiliary clutch 66. Therefore, the first cage 70 and the second cage 88 rotate relative to each other by the rotation braking torque, and the first piston 70a integrally formed on the first cage 70 moves toward the front wheel 14L side against the urging force of the spring 78 in the rotational axis C1 direction with respect to the second cage 88 via the spherical rolling elements 90, such that the rotary force of the input shaft 34 is converted into thrust in the rotational axis C1 direction. When the movable piece 82 is not being attracted by the electromagnetic coil, the second cage 88 is able to rotate relative to the cover member 54c of the unit case 54, so the second cage 88 is brought around with the first cage 70 via the spherical rolling elements 90, and the second cage 88 and the first cage 70 rotate together. As a result, the first piston 70a stops moving back and forth in the rotational axis C1 direction.

FIGS. 4A to 4E are views showing frame formats illustrating the operating principle of the ratchet mechanism 74, and show the annular first piston 70a, the annular second piston 84, and the annular holder 86 each in an expanded state. As described above, the ratchet mechanism 74 functions as a retaining mechanism and includes the annular first piston 70a, the annular second piston 84, and the annular holder 86. A protrusion 84a that protrudes on the holder 86 side is formed on the annular second piston 84. The serrated retaining teeth 86a that are connected in the circumferential direction for retaining the protrusion 84a of the second piston 84 are provided at intervals on the annular holder 86. The holder 86 is arranged in a fixed position on the input shaft 34. Also, receiving teeth 70d that have the same serrated shape as the retaining teeth 86a of the holder 86 but that are offset by half a phase in the circumferential direction, and that are connected in the circumferential direction and receive the protrusion 84a of the second piston 84, are provided at intervals on the annular first piston 70a. The annular first piston 70a is provided in a manner unable to rotate relative to the holder 86 but able to move in the rotational axis C1 direction, and moves the second piston 84 by one stroke amount of the ball cam 68 against the urging force of the spring 78. Stoppers 70e and 86b that stop the protrusion 84a from sliding are provided on inclined surfaces of the tip ends of the receiving teeth 70d of the first piston 70a and the retaining teeth 86a of the holder 86, respectively.

Figure 4A:
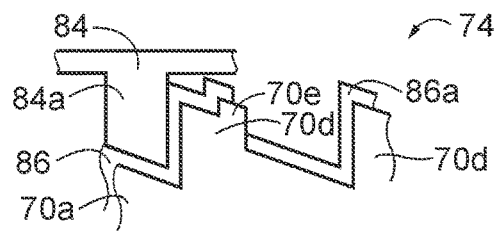
FIG. 4A is a view illustrating a trip mechanism provided in the moving mechanism shown in FIG. 3, in a state of a base position.
Figure 4B:
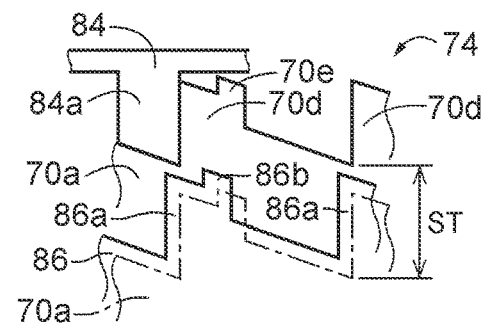
FIG. 4B is a view illustrating a trip mechanism provided in the moving mechanism shown in FIG. 3 in a state moved from the base position.
Figure 4C:
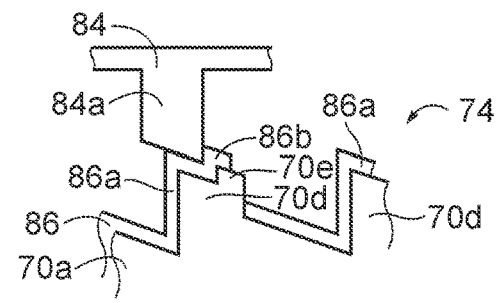
FIG. 4C is a view illustrating a trip mechanism provided in the moving mechanism shown in FIG. 3 in a state returned to the base position.
Figure 4D:
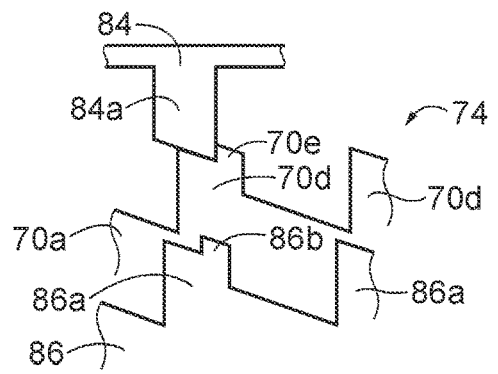
FIG. 4D is a view illustrating a trip mechanism provided in the moving mechanism shown in FIG. 3 in a state again moved from the base position.
Figure 4E:
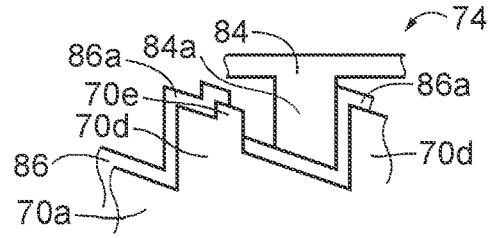
FIG. 4E is a view illustrating a trip mechanism provided in the moving mechanism shown in FIG. 3 in a state again returned to the base position.

FIGS. 4A and 4E are views of when the movable sleeve 62 is in the connect position. As shown in FIGS. 4A and 4E, when the protrusion 84a protruding from the second piston 84 is in a position where it is retained by the retaining teeth 86a of the holder 86, the first piston 70a is positioned in a base position. FIG. 4B is a view of a state in which the first piston 70a is moved from the base position against the urging force of the spring 78 by a movement stroke ST amount by operation of the first actuator 64 and the ball cam 68. In this process, the second piston 84 is moved away from the holder 86 by the first piston 70a, and the second piston 84 slides off of the inclined surface of the first piston 70a. The alternate long and short dash line shown in FIG. 4B indicates the original position of the first piston 70a in FIG. 4A in order to illustrate the movement stroke ST. FIG. 4C is a view of a state in which the first piston 70a returns by the movement stroke ST amount with the urging force of the spring 78 so as to be positioned in the base position, by the first actuator 64 and the ball cam 68 not being operated. In this process, the second piston 84 is retained on the retaining teeth 86a of the holder 86, and is maintained in the disconnect position. FIG. 4D is a view of a state in which the first piston 70a is again moved from the base position against the urging force of the spring 78 by the movement stroke ST amount by operation of the first actuator 64 and the ball cam 68. In this process, the second piston 84 is moved farther to the spring 78 side, such that a friction engagement member 98 on the input shaft 34 side of a synchronizing device 96 frictionally engages with a friction engagement member 99 on the ring gear 52 side of the synchronizing device 96, and the input shaft 34 and the ring gear 52 rotate in synchronization. Next, when the first piston 70a returns by the movement stroke ST with the urging force of the spring 78 by the first actuator 64 and the ball cam 68 not being operated, so as to be positioned in the base position, as shown in FIG. 4E, the second piston 84 is positioned in the connect position, such that the internal engaging-disengaging teeth 52d of the ring gear 52 and the external engaging-disengaging teeth 62b of the movable sleeve 62 intermesh.

As a result, with the ratchet mechanism 74, the second piston 84 is sent in the circumferential direction with the reciprocating motion of the first piston 70a by the ball cam 68, and the movable sleeve 62 is moved toward the disconnect position or the connect position. When the second piston 84 moves back and forth once, the movable sleeve 62 is positioned in the disconnect position. When the second piston 84 moves back and forth twice, i.e., when the movable sleeve 62 is in the disconnect position and the second piston 84 is then moved back and forth once, the second piston 84 is released from the retaining teeth 86a of the holder 86, and the movable sleeve 62 is positioned in the connect position by the urging force of the spring 78.

As shown in FIG. 3, the moving mechanism 72 is provided with the synchronizing device 96 that synchronizes the rotation of the input shaft 34 with the rotation of the ring gear 52 when the movable sleeve 62 has moved as far toward the disconnect position side as possible before moving to the connect position. The synchronizing device 96 is arranged between the movable sleeve 62 and the ratchet mechanism 74 on the inner diameter side of the cylindrical ring gear 52, i.e., on the inner diameter side of the cylindrical portion 52a of the ring gear 52.

In the 4WD vehicle 10 structured as described above, when a two-wheel-drive running mode is selected by an electronic control unit, not shown, while in the four-wheel-drive state in which both the first clutch 24 and the second clutch 32 are engaged, for example, in the transfer 26, the movable sleeve 62 is moved to the disconnect position by the first actuator 64 such that the first clutch 24 is released, and the sleeve 44 is moved to a non-meshing position by the second actuator 46 such that the second clutch 32 is released. As a result, a two-wheel-drive state in which driving force from the engine 12 is transmitted only to the front wheels 14 that are the main driving wheels is established. When a four-wheel-drive running mode is selected by the electronic control unit, not shown, while in the two-wheel-drive state in which both the first clutch 24 and the second clutch 32 are released, in the transfer 26, the movable sleeve 62 is moved to the connect position by the first actuator 64 such that the first clutch 24 is engaged, and the sleeve 44 is moved to the meshing position by the second actuator 46 such that the second clutch 32 is engaged. As a result, a four-wheel-drive state in which driving force from the engine 12 is transmitted to the front wheels 14 and the rear wheels 16 is established.

Figure 5:
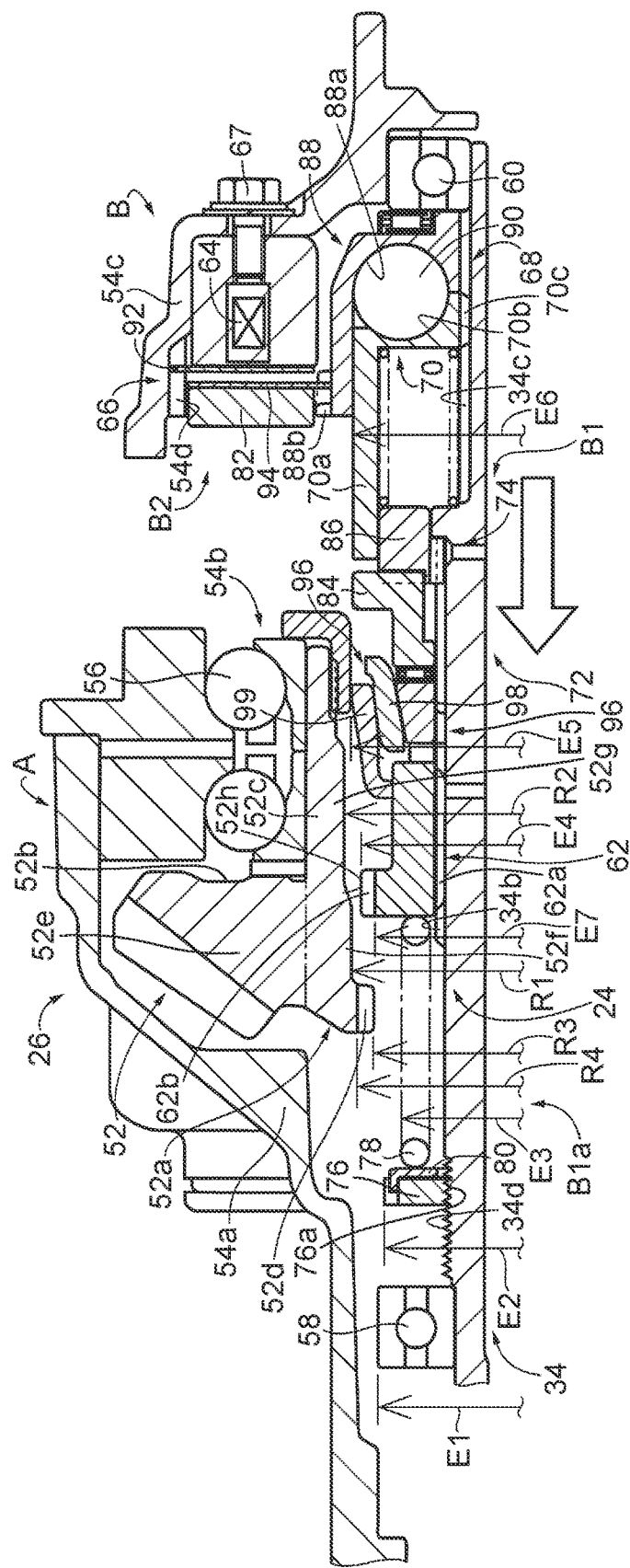
FIG. 5 is a sectional view illustrating a subassembly of a transfer in which component parts such as a sleeve, the moving mechanism, and the input shaft are integrally assembled, being assembled to a main body of the transfer in which component parts such as the ring gear are integrally assembled, according to the example embodiment.

As shown in FIG. 5, the transfer 26 includes a main body A of the transfer 26, in which component parts such as the ring gear 52 and the bearing 56 and the like that form the transfer 26 are integrally assembled to the case member 54a of the unit case 54, and a subassembly B of the transfer 26, in which component parts such as the movable sleeve 62, the moving mechanism 72, and the input shaft 34 and the like that form the transfer 26 are integrally assembled to the cover member 54c of the unit case 54. The transfer 26 is manufactured by the subassembly B being assembled to the main body A.

The subassembly is integrally provided with a generally cylindrical insert portion B1 that is inserted into the cylindrical portion 52a of the ring gear 52 arranged in an opening 54b of the case member 54a of the main body A, and a ring-shaped annular portion B2 that is larger in diameter than the insert portion B1 and covers the opening 54b of the case member 54a of the unit case 54, as shown in FIG. 5. The insert portion B1 is formed in a cylindrical shape by the component parts of the transfer 26, e.g., the input shaft 34, the first bearing 58, the stopper 76, the spring 78, the movable sleeve 62, the synchronizing device 96, and the ratchet mechanism 74 and the like, each being assembled. The annular portion B2 is formed in a ring shape by the component parts of the transfer 26, e.g., the ball cam 68, the second bearing 60, the auxiliary clutch 66, the first actuator 64, and the cover member 54c of the unit case 54 and the like, each being assembled. A cylindrical passing portion B1a is provided on a tip end portion of the insert portion B1. This passing portion B1a includes all or a portion of the component parts of the subassembly B that pass through the internal engaging-disengaging teeth 52d of the ring gear 52 in the rotational axis C1 direction when the subassembly B is inserted into and assembled to the main body A, e.g., the first end portion (a portion) of the input shaft 34 on the front wheel 14L side, and the first bearing 58, the stopper 76, the spring 78, and the end portion (a portion) of the movable sleeve 62 on the front wheel 14L side, and the like, as shown in FIGS. 3 and 5.

The cylindrical portion 52a of the ring gear 52 has a small diameter portion 52f that has an inner diameter R1, a large diameter portion 52g that has an inner diameter R2 that is larger than the inner diameter R1 of the small diameter portion 52f and is formed on the bearing 56 side of the cylindrical portion 52a, and a tapered portion 52h that connects the large diameter portion 52g and the small diameter portion 52f together, as shown in FIG. 5. The friction engagement member 99 on the ring gear 52 side of the synchronizing device 96 abuts against the tapered portion 52h of the cylindrical portion 52a when the movable sleeve 62 has moved as far as possible to the disconnect position side before moving to the connect position by the second piston 84. As shown in FIG. 3, when the subassembly B of the transfer 26 is in a state assembled to the main body A of the transfer 26, a portion of the movable sleeve 62, the synchronizing device 96, and a portion of the ratchet mechanism 74 are arranged between the cylindrical portion 52a of the ring gear 52 and the input shaft 34.

In the subassembly B, the first bearing 58, the stopper 76, and the spring 78 and the like are formed such that an outer diameter E1 of the first bearing 58, an outer diameter E2 of the stopper 76, and an outer diameter E3 of the spring 78 are each smaller than an addendum circle diameter R3 of the internal engaging-disengaging teeth 52d of the ring gear 52, as shown in FIG. 5. That is, at the passing portion B1a of the subassembly B, the outer diameter dimension of the passing portion B1a excluding the movable sleeve 62 is less than a diameter dimension of the addendum circle diameter R3 (diameter dimension of the addendum circle) of the internal engaging-disengaging teeth 52d of the ring gear 52. The synchronizing device 96 and the ratchet mechanism 74 are formed such that an outer diameter E5 of the synchronizing device 96 and an outer diameter E6 of the ratchet mechanism 74, respectively, are smaller than the inner diameter R2 of the large diameter portion 52g of the cylindrical portion 52a of the ring gear 52 and larger than the inner diameter R1 of the small diameter portion 52f of the cylindrical portion 52a. The addendum circle diameter R3 of the internal engaging-disengaging teeth 52d of the ring gear 52 is set so as to be smaller than an addendum circle diameter E4 of the external engaging-disengaging teeth 62b of the movable sleeve 62 and larger than a root circle diameter E7 of the external engaging-disengaging teeth 62b. A root circle diameter R4 of the internal engaging-disengaging teeth 52d of the ring gear 52 is set to be larger than the addendum circle diameter E4 of the external engaging-disengaging teeth 62b of the movable sleeve 62 and smaller than the inner diameter R1 of the small diameter portion 52f of the cylindrical portion 52a of the ring gear 52. That is, the outer diameter of the component parts that form the insert portion B1 of the subassembly B that is inserted into the cylindrical portion 52a of the ring gear 52, e.g., the first bearing 58, the stopper 76, the spring 78, the movable sleeve 62, the synchronizing device 96, and the ratchet mechanism 74 and the like, is smaller than the inner diameter of the cylindrical portion 52a of the ring gear 52. The outer diameter dimension of the movable sleeve 62 is the diameter dimension (addendum diameter dimension) of the addendum circle diameter E4 of the external engaging-disengaging teeth 62b of the movable sleeve 62.

Therefore, the component parts that form the insert portion B1 of the subassembly B have a shape that enables the insert portion B1 of the subassembly B of the transfer 26 to be inserted into and assembled to the cylindrical portion 52a of the ring gear 52 from the opening 54b that is open in one end of the case member 54a of the main body A of the transfer 26, as shown in FIG. 5.

As described above, with the transfer 26 of the 4WD vehicle 10 of this example embodiment, the input shaft 34 is arranged inside the ring gear 52 concentrically with the ring gear 52, with one end portion and the other end portion being rotatably supported around the rotational axis C1 by the unit case 54 via the first bearing 58 and the second bearing 60. Therefore, the rotational axis C1 of the input shaft 34 is suitably close to the rotational axis C1 of the ring gear 52, so the size in the direction perpendicular to the rotational axis C1 of the ring gear 52 in the transfer 26 is suitably reduced. Consequently, the size of the transfer 26 is able to be reduced. Furthermore, the outer diameter dimension of the passing portion B1a of the subassembly B that passes through the internal engaging-disengaging teeth 52d of the ring gear 52 in the rotational axis C1 direction when assembling the subassembly B to the main body A is less than the inner diameter dimension of the internal engaging-disengaging teeth 52d, so the insert portion B1 of the subassembly B of the transfer 26 is inserted from the opening 54b of the case member 54a, and the passing portion B1a of the subassembly B is passed through the internal engaging-disengaging teeth 52d of the ring gear 52. As a result, the subassembly B is able to be assembled to the main body A of the transfer 26 to which component parts such as the ring gear 52 and the like are integrally assembled, so the component parts of the transfer such as the movable sleeve 62, the moving mechanism 72, and the input shaft 34 and the like can be made into a subassembly.

According to the transfer 26 of the 4WD vehicle 10 of this example embodiment, the passing portion B1a of the subassembly B that passes through the internal engaging-disengaging teeth 52d of the ring gear 52 includes a portion of the movable sleeve 62, and the inner diameter dimension of the internal engaging-disengaging teeth 52d of the ring gear 52 is the diameter dimension of the root circle diameter R4 of the internal engaging-disengaging teeth 52d, and the outer diameter dimension of the movable sleeve 62 is the diameter dimension of the addendum circle diameter E4 of the external engaging-disengaging teeth 62b of the movable sleeve 62. Therefore, the outer diameter dimension of the movable sleeve 62 is less than the diameter dimension of the root circle diameter R4 of the internal engaging-disengaging teeth 52d of the ring gear 52, and the outer diameter dimension of the movable sleeve 62 is the diameter dimension of the addendum circle diameter E4 of the external engaging-disengaging teeth 62b of the movable sleeve 62. Therefore, in the subassembly B, a portion of the movable sleeve 62 is able to pass through the internal engaging-disengaging teeth 52d of the ring gear 52, and the external engaging-disengaging teeth 62b of the movable sleeve 62 is able to be made to intermesh with the internal engaging-disengaging teeth 52d of the ring gear 52.

According to the transfer 26 of the 4WD vehicle 10 of this example embodiment, the passing portion B1a of the subassembly B that passes through the internal engaging-disengaging teeth 52d of the ring gear 52 includes the first bearing 58 that fits onto the end portion on the front wheel 14L side of the input shaft 34, and the inner diameter dimension of the internal engaging-disengaging teeth 52d of the ring gear 52 is the diameter dimension of the addendum circle diameter R3 of the internal engaging-disengaging teeth 52d of the ring gear 52. Therefore, the dimension of the outer diameter E1 of the first bearing 58 is less than the diameter dimension of the addendum circle diameter R3 of the internal engaging-disengaging teeth 52d of the ring gear 52, so in the subassembly B, the first bearing 58 that fits onto the end portion on the front wheel 14L side of the input shaft 34 is preferably able to be passed through the internal engaging-disengaging teeth 52d of the ring gear 52.

According to the transfer 26 of the 4WD vehicle 10 of this example embodiment, the moving mechanism 72 includes the ball cam 68, the auxiliary clutch 66, the first actuator 64, and the spring 78. The second cage 88 that is one of the pair of the first cage 70 and the second cage 88 provided in the ball cam 68 is provided in a manner not able to rotate relative to the second friction plate 94 of the auxiliary clutch 66, and the first cage 70 that is the other of the pair of the first cage 70 and the second cage 88 is provided in a manner not able to rotate relative to the input shaft 34. Also, the movable sleeve 62 is provided in a manner not able to rotate relative to the input shaft 34 but able to move in the rotational axis C1 direction. Rotation braking torque is applied to the second cage 88 by the first actuator 64 and the auxiliary clutch 66, axial thrust is generated in the ball cam 68, and the movable sleeve 62 is moved in the rotational axis C1 direction by the first cage 70 against the urging force of the spring 78. Therefore, in the subassembly B of the transfer 26 in which the movable sleeve 62, the moving mechanism 72, and the input shaft 34 and the like are integrally assembled, it is possible to confirm performance of the first actuator 64 by operating the first actuator 64 to check whether the moving mechanism 72 moves the movable sleeve 62 in the rotational axis C1 direction, before assembling the subassembly B to the main body A of the transfer 26.

According to the transfer 26 of the 4WD vehicle 10 of this example embodiment, the first actuator 64 is an electromagnetic coil that generates rotation braking torque in the auxiliary clutch 66 to operate the ball cam 68. Therefore, by operating the electromagnetic coil that is the first actuator 64, rotation braking torque is applied to the second cage 88 of the ball cam 68 by the auxiliary clutch 66.

According to the transfer 26 of the 4WD vehicle 10 of this example embodiment, the ratchet mechanism 74 is provided which includes the first piston 70a that is moved in a reciprocating manner in the rotational axis C1 direction by the predetermined movement stroke ST via the ball cam 68 by the first actuator 64, the second piston 84 that is provided relatively rotatable with respect to the input shaft 34 and is moved against the urging force of the spring 78 by the first piston 70a, and the holder 86 that has the retaining teeth 86a, is provided relatively non-rotatable with respect to the input shaft 34 and non-movable in the rotational axis C1 direction, and retains the second piston 84 that is moved by the first cage 70 with the retaining teeth 86a. In this ratchet mechanism 74, the second piston 84 moves the movable sleeve 62 against the urging force of the spring 78 to the disconnect position that allows relative rotation between the ring gear 52 and the input shaft 34, by one reciprocating stroke of the first piston 70a. Beyond that one reciprocating stroke, the second piston 84 is released, and the movable sleeve 62 is moved to the connect position that relatively non-rotatably connects the ring gear 52 to the input shaft 34 with the urging force of the spring 78. This ratchet mechanism 74 is arranged between the movable sleeve 62 and the second cage 88 of the ball cam 68. Therefore, the ratchet mechanism 74 is also able to be assembled to the subassembly B.

According to the transfer 26 of the 4WD vehicle 10 of this example embodiment, on the input shaft 34, the stopper 76 that is fixed to the input shaft 34 is fixed between the movable sleeve 62 and the first bearing 58, and the spring 78 is arranged between the stopper 76 and the movable sleeve 62. Therefore, for example, with a subassembly of a transfer in which the spring 78 is arranged between the movable sleeve 62 and the first bearing 58 on the input shaft 34, the first bearing 58 that is provided on the input shaft 34 may come off from the urging force of the spring 78, but with the subassembly B, the spring 78 is arranged between the movable sleeve 62 and the stopper 76 on the input shaft 34, so the urging force of the spring 78 is received by the stopper 76. As a result, the first bearing 58 is able to be prevented from coming off of the input shaft 34.

According to the transfer 26 of the 4WD vehicle 10 of this example embodiment, the outer diameter of the external engaging-disengaging teeth 62b formed on the outer periphery of the movable sleeve 62 is smaller than the inner diameter of the cylindrical portion 52a of the ring gear 52, and the internal engaging-disengaging teeth 52d formed on the ring gear 52 is arranged between the cylindrical portion 52a of the ring gear 52 and the input shaft 34. Therefore, the movable sleeve 62 is able to be suitably passed through the cylindrical portion 52a of the ring gear 52 when the insert portion B1 of the subassembly B is inserted into the cylindrical portion 52a of the ring gear 52.

While the example embodiments have been described above in detail with reference to the drawings, the disclosure may also be applied in other modes.

For example, the 4WD vehicle 10 of the example embodiment described above is a FF-based vehicle that includes the front wheel driving force distributing unit 20 having the transfer 26, but the disclosure may also be carried out in combination with a FR-based vehicle or a RR-based vehicle or the like as appropriate. With a FR-based vehicle or a RR-based vehicle, a rear wheel driving force distributing unit having a structure substantially similar to that of the front wheel driving force distributing unit 20 described above is used with rear wheels.

Also, in the transfer 26 of the 4WD vehicle 10 of the example embodiment described above, the moving mechanism 72 includes the ball cam 68 and the ratchet mechanism 74 that operate the second piston 84 with a larger stroke than the operation stroke of the movable piece 82 that is attracted by the electromagnetic coil that is the first actuator 64. However, instead of the first actuator 64 that is the electromagnetic coil, an electromagnetic actuator, a motor, or a hydraulic cylinder or the like with a large operation stroke, for example, may be used as an actuator, and the second piston 84 may be moved by this actuator. In this case, the moving mechanism 72 does not need to have the ball cam 68 or the ratchet mechanism 74. Also, the number of tiers of the receiving teeth 70d of the first piston 70a in the ratchet mechanism 74 and the number of tiers of the retaining teeth 86a of the holder 86 is one tier, but it may also be two or more tiers, for example. That is, in the ratchet mechanism 74, the movable sleeve 62 may be moved against the urging force of the spring 78 to the disconnect position by the second piston 84 with a predetermined number of times, e.g., two or more, that the first piston 70a moves in a reciprocating manner, and when the number of times that the first piston 70a moves in a reciprocating manner exceeds the predetermined number of times, the second piston 84 may be released from the retaining teeth of the holder 86 and the movable sleeve 62 may be moved to the connect position with the urging force of the spring 78.

In the transfer 26 of the 4WD vehicle 10 of the example embodiment described above, the moving mechanism 72 is provided with the synchronizing device 96, but the moving mechanism 72 does not necessarily have to be provided with the synchronizing device 96.

In the transfer 26 of the 4WD vehicle 10 of the example embodiment described above, the cover member 54c of the unit case 54, the movable sleeve 62, the moving mechanism 72, and the input shaft 34 and the like are all assembled to the subassembly B, but it is sufficient if at least the input shaft 34, the movable sleeve 62, and the moving mechanism 72 are assembled to the unit case 54. The parts that form the transfer 26 other than the case member 54a and the ring gear 52 may also be attached. Also, the case member 54a of the unit case 54, the ring gear 52, and the bearing 56 and the like are assembled to the main body A of the transfer 26, but it is sufficient if at least the case member 54a and the ring gear 52 are assembled to the main body A of the transfer 26. The parts that form the transfer 26 other than the input shaft 34, the movable sleeve 62, and the moving mechanism 72 described above may also be attached.

In the transfer 26 of the 4WD vehicle 10 of the example embodiment described above, the internal engaging-disengaging teeth 52d is integrally provided on the ring gear 52, but the internal engaging-disengaging teeth 52d that are initially separate from the ring gear 52 may also be integrally provided on the ring gear 52 by welding or the like, for example. The external engaging-disengaging teeth 62b are integrally provided on the movable sleeve 62, but the external engaging-disengaging teeth 62b that are initially separate from the movable sleeve 62 may be integrally provided on the movable sleeve 62 by welding or the like, for example. In the transfer 26 of the 4WD vehicle 10 of the example embodiment described above, the passing portion B1a of the subassembly B includes a portion of the movable sleeve 62, but the shape of the movable sleeve 62 may also be changed such that the entire movable sleeve 62 is able to pass through the internal engaging-disengaging teeth 52d of the ring gear 52, i.e., such that the entire movable sleeve 62 is included in the passing portion B1a of the subassembly B.

The example embodiments described above are merely examples. That is, the disclosure may be carried out in modes that have been modified or improved in any of a variety of ways based on the knowledge of one skilled in the art.

What is claimed is:

1. A transfer of a vehicle, the vehicle including a driving source, a power transmitting member, main driving wheels and auxiliary driving wheels, the transfer outputting some of the driving force to be transmitted from a driving source to the main driving wheels to the auxiliary driving wheels via the power transmitting member when the vehicle is switched from a two-wheel-drive state to a four-wheel-drive state, the transfer comprising:

a main body including a ring gear, a case member and a third bearing,
      the ring gear including a cylindrical portion and ring gear-side engaging-disengaging teeth, the ring gear-side engaging-disengaging teeth being integrally provided on an inner diameter side of the cylindrical portion, and the case member supporting the ring gear via the third bearing in a manner enabling the ring gear to rotate around a rotational axis;

a subassembly including an input shaft, a sleeve, a moving mechanism, a first bearing a case cover, and a second bearing, the input shaft, the sleeve, and the moving mechanism being integrally assembled, the input shaft being arranged concentric with the ring gear and inside the ring gear, the input shaft being supported at a first end portion of the input shaft by the case member, and the input shaft being supported at a second end portion of the input shaft by the case cover in a manner rotatable around the rotational axis via the first bearing and the second bearing; and a connecting-disconnecting mechanism configured to selectively connect and disconnect the ring gear to and from the input shaft, the connecting-disconnecting mechanism including the sleeve, the sleeve being configured to move in the rotational axis direction on the input shaft, the sleeve being configured not to rotate relative to the input shaft, the sleeve including sleeve-side engaging-disengaging teeth on an outer diameter side of the sleeve, the connecting-disconnecting mechanism being configured to selectively output some of the driving force to the auxiliary driving wheels depending on whether the ring gear-side engaging-disengaging teeth and the sleeve-side engaging-disengaging teeth are in mesh or not in mesh, the case member having an opening, in an end portion in the rotational axis direction of the case member, for inserting the subassembly into the main body and assembling the subassembly to the main body, the ring gear-side engaging-disengaging teeth having an inner diameter dimension that is smaller than the inner diameter dimension of the cylindrical portion, an outer diameter dimension of at least one of the input shaft, the sleeve, the moving mechanism, the first bearing, and the second bearing of the subassembly or an outer diameter dimension of a portion of at least one of the input shaft, the sleeve, the moving mechanism, the first bearing, and the second bearing of the subassembly being less than the inner diameter dimension of the ring gear-side engaging-disengaging teeth, the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly pass through the ring gear-side engaging-disengaging teeth in the rotational axis direction when the subassembly is inserted into and assembled to the main body.

2. The transfer according to claim 1, wherein the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly that pass through the ring gear-side engaging-disengaging teeth include the sleeve;

the inner diameter dimension of the ring gear-side engaging-disengaging teeth is a diameter dimension of a root circle of the ring gear-side engaging-disengaging teeth; and the outer diameter dimension of the sleeve is an addendum diameter dimension of the sleeve-side engaging-disengaging teeth.

3. The transfer according to claim 1, wherein the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly that pass through the ring gear-side engaging-disengaging teeth include the first bearing that fits over the first end portion of the input shaft; and the inner diameter dimension of the ring gear-side engaging-disengaging teeth is a diameter dimension of an addendum circle of the ring gear-side engaging-disengaging teeth.

4. The transfer according to claim 1, wherein the moving mechanism includes a ball cam, a clutch, an actuator, and a spring;

the ball cam includes a first cage and a second cage, the first cage being provided in a non-rotatable manner relative to input shaft, and the second cage being provided in a non-rotatable manner relative to a friction plate of the clutch; and the sleeve is provided in a manner non-rotatable relative to the input shaft and able to move in an axial direction, rotation braking torque is applied to the second cage by the actuator and the clutch, such that thrust in the axial direction is generated in the ball cam, and the sleeve is moved in the axial direction against spring force of the spring by the first cage.

5. The transfer according to claim 4, wherein the actuator is an electromagnetic coil that generates the rotation braking torque in the clutch to operate the ball cam.

6. The transfer according to claim 4, further comprising:

a trip mechanism arranged between the second cage and the sleeve, the trip mechanism including a first piston, a second piston, and a holder, the first piston being configured to be driven in a reciprocating manner in the rotational axis direction a predetermined stroke via the ball cam by the actuator, the second piston being provided in a rotatable manner relative to the input shaft, the second piston being configured to move against the spring force by the first piston, the holder including a plurality of tiers of retaining teeth, the holder being provided in a non-rotatable manner relative to the input shaft and in a non-movable manner in the rotational axis direction, the holder retaining the second piston moved by the first piston by any of the plurality of tiers of retaining teeth, the trip mechanism being configured such that the second piston moves the sleeve against the spring force to a disconnect position by a predetermined number of reciprocating strokes of the first piston, the disconnect position being a position of the sleeve that allows relative rotation between the ring gear and the input shaft;

the trip mechanism being configured to release the second piston when the reciprocating stroke of the first piston exceeds the predetermined number of reciprocating strokes and move the sleeve to a connect position with the spring force, the connect position being a position of the sleeve that relatively non-rotatably connects the ring gear and the input shaft together.

7. The transfer according to claim 4, further comprising a stopper fixed to the input shaft, the stopper being fixed between the sleeve and the first bearing, wherein the spring is arranged between the stopper and the sleeve.

8. A transfer of a vehicle, the vehicle including a driving source, a power transmitting member, main driving wheels and auxiliary driving wheels, the transfer outputting some of the driving force to be transmitted from a driving source to the main driving wheels to the auxiliary driving wheels via the power transmitting member when the vehicle is switched from a two-wheel-drive state to a four-wheel-drive state, the transfer comprising:
  a main body including a ring gear, a case member and a third bearing,
    the ring gear including a cylindrical portion and ring gear-side engaging-disengaging teeth, the ring gear-side engaging-disengaging teeth being integrally provided on an inner diameter side of the cylindrical portion, and
    the case member supporting the ring gear via the third bearing in a manner enabling the ring gear to rotate around a rotational axis;
  a subassembly including an input shaft, a sleeve, a moving mechanism, a first bearing, a case cover, and a second bearing,
    the input shaft, the sleeve, and the moving mechanism being integrally assembled,
    the input shaft being arranged concentric with the ring gear and inside the ring gear, the input shaft being supported at a first end portion of the input shaft by the case member, and the input shaft being supported at a second end portion of the input shaft by the case cover in a manner rotatable around the rotational axis via the first bearing and the second bearing; and
  a connecting-disconnecting mechanism configured to selectively connect and disconnect the ring gear to and from the input shaft,
  the connecting-disconnecting mechanism including the sleeve,
    the sleeve being configured to move in the rotational axis direction on the input shaft, the sleeve being configured not to rotate relative to the input shaft, the sleeve including sleeve-side engaging-disengaging teeth on an outer diameter side of the sleeve,
  the connecting-disconnecting mechanism being configured to selectively output some of the driving force to the auxiliary driving wheels depending on whether the ring gear-side engaging-disengaging teeth and the sleeve-side engaging-disengaging teeth are in mesh or not in mesh,
  the case member having an opening, in an end portion in the rotational axis direction of the case member, for inserting the subassembly into the main body and assembling the subassembly to the main body,
  an outer diameter dimension of at least one of the input shaft, the sleeve, the moving mechanism, the first bearing, and the second bearing of the subassembly or an outer diameter dimension of a portion of at least one of the input shaft, the sleeve, the moving mechanism, the first bearing, and the second bearing of the subassembly being less than an inner diameter dimension of the ring gear-side engaging-disengaging teeth,
  the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly pass through the ring gear-side engaging-disengaging teeth in the rotational axis direction when the subassembly is inserted into and assembled to the main body,
  the inner diameter dimension of the ring gear-side engaging-disengaging teeth is a diameter dimension of a root circle of the ring gear-side engaging-disengaging teeth or an addendum circle of the ring gear-side engaging-disengaging teeth,
  the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly that pass through the ring gear-side engaging-disengaging teeth include the first bearing that fits over the first end portion of the input shaft,
  the outer diameter dimension of the first bearing is smaller than the diameter dimension of the root circle of the ring gear-side engaging-disengaging teeth or the addendum circle of the ring gear-side engaging-disengaging teeth.

9. The transfer according to claim 8, wherein
the moving mechanism includes a ball cam, a clutch, an actuator, and a spring;
the ball cam includes a first cage and a second cage, the first cage being provided in a non-rotatable manner relative to input shaft, and the second cage being provided in a non-rotatable manner relative to a friction plate of the clutch; and
the sleeve is provided in a manner non-rotatable relative to the input shaft and able to move in an axial direction, rotation braking torque is applied to the second cage by the actuator and the clutch, such that thrust in the axial direction is generated in the ball cam, and the sleeve is moved in the axial direction against spring force of the spring by the first cage.

10. The transfer according to claim 9, wherein
the actuator is an electromagnetic coil that generates the rotation braking torque in the clutch to operate the ball cam.

11. The transfer according to claim 9, further comprising:
a trip mechanism arranged between the second cage and the sleeve, the trip mechanism including a first piston, a second piston, and a holder,
  the first piston being configured to be driven in a reciprocating manner in the rotational axis direction a predetermined stroke via the ball cam by the actuator,
  the second piston being provided in a rotatable manner relative to the input shaft, the second piston being configured to move against the spring force by the first piston,
  the holder including a plurality of tiers of retaining teeth, the holder being provided in a non-rotatable manner relative to the input shaft and in a non-movable manner in the rotational axis direction, the holder retaining the second piston moved by the first piston by any of the plurality of tiers of retaining teeth, the trip mechanism being configured such that the second piston moves the sleeve against the spring force to a disconnect position by a predetermined number of reciprocating strokes of the first piston, the disconnect position being a position of the sleeve that allows relative rotation between the ring gear and the input shaft;

the trip mechanism being configured to release the second piston when the reciprocating stroke of the first piston exceeds the predetermined number of reciprocating strokes and move the sleeve to a connect position with the spring force, the connect position being a position of the sleeve that relatively non-rotatably connects the ring gear and the input shaft together.

12. The transfer according to claim 9, further comprising a stopper fixed to the input shaft, the stopper being fixed between the sleeve and the first bearing, wherein the spring is arranged between the stopper and the sleeve.

13. A transfer of a vehicle, the vehicle including a driving source, a power transmitting member, main driving wheels and auxiliary driving wheels, the transfer outputting some of the driving force to be transmitted from a driving source to the main driving wheels to the auxiliary driving wheels via the power transmitting member when the vehicle is switched from a two-wheel-drive state to a four-wheel-drive state, the transfer comprising:

a main body including a ring gear, a case member and a third bearing, the ring gear including a cylindrical portion and ring gear-side engaging-disengaging teeth, the ring gear-side engaging-disengaging teeth being integrally provided on an inner diameter side of the cylindrical portion, the case member supporting the ring gear via the third bearing in a manner enabling the ring gear to rotate around a rotational axis;

a subassembly including an input shaft, a sleeve, a moving mechanism, a first bearing, a case cover and a second bearing, the input shaft, the sleeve, and the moving mechanism being integrally assembled, the input shaft being arranged concentric with the ring gear and inside the ring gear, the input shaft being supported at a first end portion of the input shaft by the case member, and the input shaft being supported at a second end portion of the input shaft by the case cover in a manner rotatable around the rotational axis via the first bearing and the second bearing;

a trip mechanism; and a connecting-disconnecting mechanism configured to selectively connect and disconnect the ring gear to and from the input shaft, the connecting-disconnecting mechanism including the sleeve, the sleeve being configured to move in the rotational axis direction on the input shaft, the sleeve being configured not to rotate relative to the input shaft, the sleeve including sleeve-side engaging-disengaging teeth on an outer diameter side of the sleeve, the connecting-disconnecting mechanism being configured to selectively output some of the driving force to the auxiliary driving wheels depending on whether the ring gear-side engaging-disengaging teeth and the sleeve-side engaging-disengaging teeth are in mesh or not in mesh, the case member having an opening, in an end portion in the rotational axis direction of the case member, for inserting the subassembly into the main body and assembling the subassembly to the main body, an outer diameter dimension of at least one of the input shaft, the sleeve, the moving mechanism, the first bearing, and the second bearing of the subassembly or an outer diameter dimension of a portion of at least one of the input shaft, the sleeve, the moving mechanism, the first bearing, and the second bearing of the subassembly being less than an inner diameter dimension of the ring gear-side engaging-disengaging teeth, the at least one of the input shaft, the sleeve, the moving mechanism, the first bearing, and the second bearing or the portion of the at least one of the input shaft, the sleeve, the moving mechanism, the first bearing, and the second bearing pass through the ring gear-side engaging-disengaging teeth in the rotational axis direction when the subassembly is inserted into and assembled to the main body, the moving mechanism includes a ball cam, a clutch, an actuator, and a spring;

the ball cam includes a first cage and a second cage, the first cage being provided in a non-rotatable manner relative to input shaft, and the second cage being provided in a non-rotatable manner relative to a friction plate of the clutch;

the sleeve is provided in a manner non-rotatable relative to the input shaft and able to move in an axial direction, rotation braking torque is applied to the second cage by the actuator and the clutch, such that thrust in the axial direction is generated in the ball cam, and the sleeve is moved in the axial direction against spring force of the spring by the first cage, the trip mechanism is arranged between the second cage and the sleeve, the trip mechanism including a first piston, a second piston, and a holder, the first piston being configured to be driven in a reciprocating manner in the rotational axis direction a predetermined stroke via the ball cam by the actuator, the second piston being provided in a rotatable manner relative to the input shaft, the second piston being configured to move against the spring force by the first piston, the holder including a plurality of tiers of retaining teeth, the holder being provided in a non-rotatable manner relative to the input shaft and in a non-movable manner in the rotational axis direction, the holder retaining the second piston moved by the first piston by any of the plurality of tiers of retaining teeth, the trip mechanism being configured such that the second piston moves the sleeve against the spring force to a disconnect position by a predetermined number of reciprocating strokes of the first piston, the disconnect position being a position of the sleeve that allows relative rotation between the ring gear and the input shaft; and the trip mechanism being configured to release the second piston when the reciprocating stroke of the first piston exceeds the predetermined number of reciprocating strokes and move the sleeve to a connect position with the spring force, the connect position being a position of the sleeve that relatively non-rotatably connects the ring gear and the input shaft together.

14. The transfer according to claim 13, wherein
the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly that pass through the ring gear-side engaging-disengaging teeth include the sleeve;
the inner diameter dimension of the ring gear-side engaging-disengaging teeth is a diameter dimension of a root circle of the ring gear-side engaging-disengaging teeth; and
the outer diameter dimension of the sleeve is an addendum diameter dimension of the sleeve-side engaging-disengaging teeth.

15. The transfer according to claim 13, wherein
the at least one of the input shaft, the sleeve, the moving mechanism, the first bearing, and the second bearing of the subassembly or the portion of the at least one of the input shaft, the sleeve, the moving mechanism, the first bearing, and the second bearing of the subassembly that pass through the ring gear-side engaging-disengaging teeth include the first bearing that fits over the first end portion of the input shaft; and
the inner diameter dimension of the ring gear-side engaging-disengaging teeth is a diameter dimension of an addendum circle of the ring gear-side engaging-disengaging teeth.

16. The transfer according to claim 13, wherein
the actuator is an electromagnetic coil that generates the rotation braking torque in the clutch to operate the ball cam.

17. The transfer according to claim 13, further comprising
a stopper fixed to the input shaft, the stopper being fixed between the sleeve and the first bearing, wherein
the spring is arranged between the stopper and the sleeve.

* * * * *

UNITED STATES PATENT AND TRADEMARK OFFICE
CERTIFICATE OF CORRECTION

PATENT NO. : 10,118,484 B2
APPLICATION NO. : 15/051233
DATED : November 6, 2018
INVENTOR(S) : Takahiro Yoshimura and Ryota Horie Page 1 of 1

It is certified that error appears in the above-identified patent and that said Letters Patent is hereby corrected as shown below:

In the Claims

Column 19, Claim 1, Line 8, delete "a first bearing a case cover" and insert --a first bearing, a case cover--, therefor.

Signed and Sealed this
Twenty-sixth Day of February, 2019

Andrei Iancu
*Director of the United States Patent and Trademark Office*